(12) United States Patent
Youngblood et al.

(10) Patent No.: US 12,079,922 B2
(45) Date of Patent: Sep. 3, 2024

(54) SYSTEM AND METHOD FOR TRANSLATING A 2D IMAGE TO A 3D IMAGE

(71) Applicant: XEROX CORPORATION, Norwalk, CT (US)

(72) Inventors: Gregory M. Youngblood, Minden, NV (US); Matthew Shreve, Mountain View, CA (US); Mark J. Stefik, Portola Valley, CA (US); Robert Thomas Krivacic, San Jose, CA (US); Lester D. Nelson, Santa Clara, CA (US); Jacob Le, Palo Alto, CA (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 18/152,068

(22) Filed: Jan. 9, 2023

(65) Prior Publication Data

US 2023/0162432 A1    May 25, 2023

Related U.S. Application Data

(63) Continuation of application No. 17/138,600, filed on Dec. 30, 2020, now Pat. No. 11,551,406.

(51) Int. Cl.
  *G06T 15/10* (2011.01)
  *G06T 15/04* (2011.01)
  *G06T 15/80* (2011.01)

(52) U.S. Cl.
  CPC .............. *G06T 15/10* (2013.01); *G06T 15/04* (2013.01); *G06T 15/80* (2013.01)

(58) Field of Classification Search
  None
  See application file for complete search history.

(56) References Cited

U.S. PATENT DOCUMENTS

| | | | |
|---|---|---|---|
| 10,846,817 B2 * | 11/2020 | Kanzawa | .................. G06T 7/11 |
| 2005/0225569 A1 | 10/2005 | Kim | |
| 2009/0259483 A1 | 10/2009 | Hendrickson et al. | |
| 2015/0229927 A1 * | 8/2015 | Inada | ..................... H04N 19/46 |
| | | | 375/240.08 |
| 2018/0253596 A1 * | 9/2018 | Barman | ............... G06V 10/147 |
| 2021/0272352 A1 * | 9/2021 | Le | ........................... A63F 13/63 |

OTHER PUBLICATIONS

Ruiz Torres, Borja. Contour map representation through augmented reality. MS thesis. Universitat Politècnica de Catalunya, 2012 (Year: 2012).*
Provisional of 20210272352 (Year: 2020).*
https://contourmapcreator.urgr8.ch/, Created Aug. 18, 2013.
https://contourmapgenerator.com/#15/40.5452/-121.3801, published 2019.
https://github.com/s-macke/VoxelSpace/, Published Jan. 3, 2020.

\* cited by examiner

*Primary Examiner* — Nurun Flora
(74) *Attorney, Agent, or Firm* — Krista A. Wittman

(57) ABSTRACT

A system and method for translating a 2D image to a 3D image is provided. A 2D image having pixels grouped into tiles is obtained. Contour lines associated with an altitude value are located on the 2D image. The altitude values are determined. Each tile in the 2D image is represented using at least one voxel. A height map of the voxels is generated based on the contour lines and altitude values as a base layer for a 3D image. A terrain type of each of the voxels of the 3D image is determined and objects are placed in the 3D image. The 3D image is output.

20 Claims, 14 Drawing Sheets

```
                GRASSLANDS: ◄─57                              50
                {                                              ◄
 52 ─►  "name": "grassland",
 53 ─►  "colors":
           [
              {"max_alt":220,
                "low_rgb": [200, 225, 185],
                "high_rgb": [200, 225, 185]
     54 {   },
              {"max_alt":255,
                "low_rgb": [200, 225, 185],
                "high_rgb": [255, 255, 255]
              }
           ],
 55 ─► "overlay": {
              "paint_mode": "overlay", "position": "random", "region_inx": 0,
     56 { "count": 7,
              "regions": [
                 [
                    [[ 0, 0, 0],[ 0, 0, 0],[238,247,236],[ 0, 0, 0],[ 0, 0, 0]]
                 ],
                 [
                    [[ 0, 0, 0],[ 0, 0, 0],[238,247,236],[ 0, 0, 0],[ 0, 0, 0]],
                    [[ 0, 0, 0],[ 0, 0, 0],[238,247,236],[ 0, 0, 0],[ 0, 0, 0]]
                 ]
              ]
           }
        }           FIG. 3B
```

AIRPORT TOWER  120

121 → { "name": "air tower",
122 → "paint_mode": "overlay",
     "position": "center", ← 123
     "region_inx": 0, ← 124
     "regions": [ ← 125
     [
     [[149,156,165],[149,156,165],[149,156,165],[149,156,165],[149,156,165]],
     [[149,156,165],[ 80, 80, 80],[ 80, 80, 80],[ 80, 80, 80],[149,156,165]],
     [[149,156,165],[ 80, 80, 80],[ 80, 80, 80],[ 80, 80, 80],[149,156,165]],
     [[149,156,165],[ 80, 80, 80],[ 80, 80, 80],[ 80, 80, 80],[149,156,165]],
     [[149,156,165],[149,156,165],[149,156,165],[149,156,165],[149,156,165]]
     ]
     ]
     }

FIG. 11A

SYSTEM AND METHOD FOR TRANSLATING A 2D IMAGE TO A 3D IMAGE

This invention was made with government support under Contract No. FA8650-17-C-7710 awarded by the Defense Advanced Research Projects Agency. The government has certain rights in the invention.

FIELD

This application relates in general to image generation and transformation, and in particular to a system and method for translating a 3D image into a 2D image.

BACKGROUND

As technology advances, the way in which we view images has changed. For example, in the 1970s and 1980s, video games were commonly available in a 2D format. However, by the 1990s, video games in 3D become popular and widely used. During the same time, maps, simulations, and terrain image views, both real world and fictional, were also increasing in popularity and use. 3D visualizations provide a viewer with additional information about the area being visualized and can help the user to orient herself within the visualization.

However, although 3D visualizations of an area can provide more information than a 2D visualization, there are times when accessing a top down view of the area is helpful to orient the user with respect to the total area covered by the visualization. The 2D visual can be used concurrently or within the 3D visual to show, for instance, a path of the viewer, within the area represented by the 3D map. Further, there are times when going from a 2D visualization, such as a top down view, to a 3D view is helpful.

Currently, some map generation systems add contour lines to existing 2D topological map images using height data, which then adds height information to the map. Further, shading can be added. However, feature information about the area or terrain represented by the visualized area, such as objects, is not provided. Current mapping systems fail to provide realistic maps that can translate between 2D and 3D visualizations using height and features of an area or terrain.

Accordingly, what is needed is the ability to generate maps that can transition between 2D and 3D. Preferably, each visualization is stored with data that assists in transforming to a different type of visualization.

SUMMARY

A 3D visualization of an area, such as real-world terrain or a virtual world is generated with layered data that can be used to create a 2D topological map image. The 3D visualization is generated from voxels that are scaled to output tiles for a 2D image. Data from the 3D visualization, including data associated with the voxels, such as color, height, elevation, and objects, are then placed within the 2D visualization. Conversely, data from the 2D visualization can be used to generate the 3D visualization. The 3D visualization is generated based on altitude values obtained from contour lines in the 2D visualization. Subsequently, terrain type and objects are placed within the 2D visualization.

A system and method for translating a 2D image to a 3D image is provided. A 2D image having pixels grouped into tiles is obtained. Contour lines associated with an altitude value are located on the 2D image. The altitude values are determined. Each tile in the 2D image is represented using at least one voxel. A height map of the voxels is generated based on the contour lines and altitude values as a base layer for a 3D image. A terrain type of each of the voxels of the 3D image is determined and objects are placed in the 3D image. The 3D image is output.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, including time and clustering of events, all without departing from their spirit and the scope. Accordingly, the drawings and detailed description are to be regarded as illustrative in nature and not as restrictive.

BRIEF DESCRIPTION OF THE DRAWINGS

FIG. 3B is a block diagram showing, by way of example, a layer expansion template for grasslands.

FIG. 11A is a block diagram showing, by way of example, an object template for an airport tower.

DETAILED DESCRIPTION

Currently, visualizations, such as maps, of real-world terrain or online worlds are generated in either 2D or 3D based on a purpose of or audience of the map. Specifically, current map systems generate maps of a specific area in designated dimensions without considering or enabling the maps to be used to generate a different map of the same area in a different dimension. However, there are times when having a 2D and 3D map of a common area is helpful, or when transitioning between the two types of maps can be helpful, such as to orient one's self Therefore, generating maps with sufficient data can allow transformation of the map from one dimension to another when processed.

Figure 1:
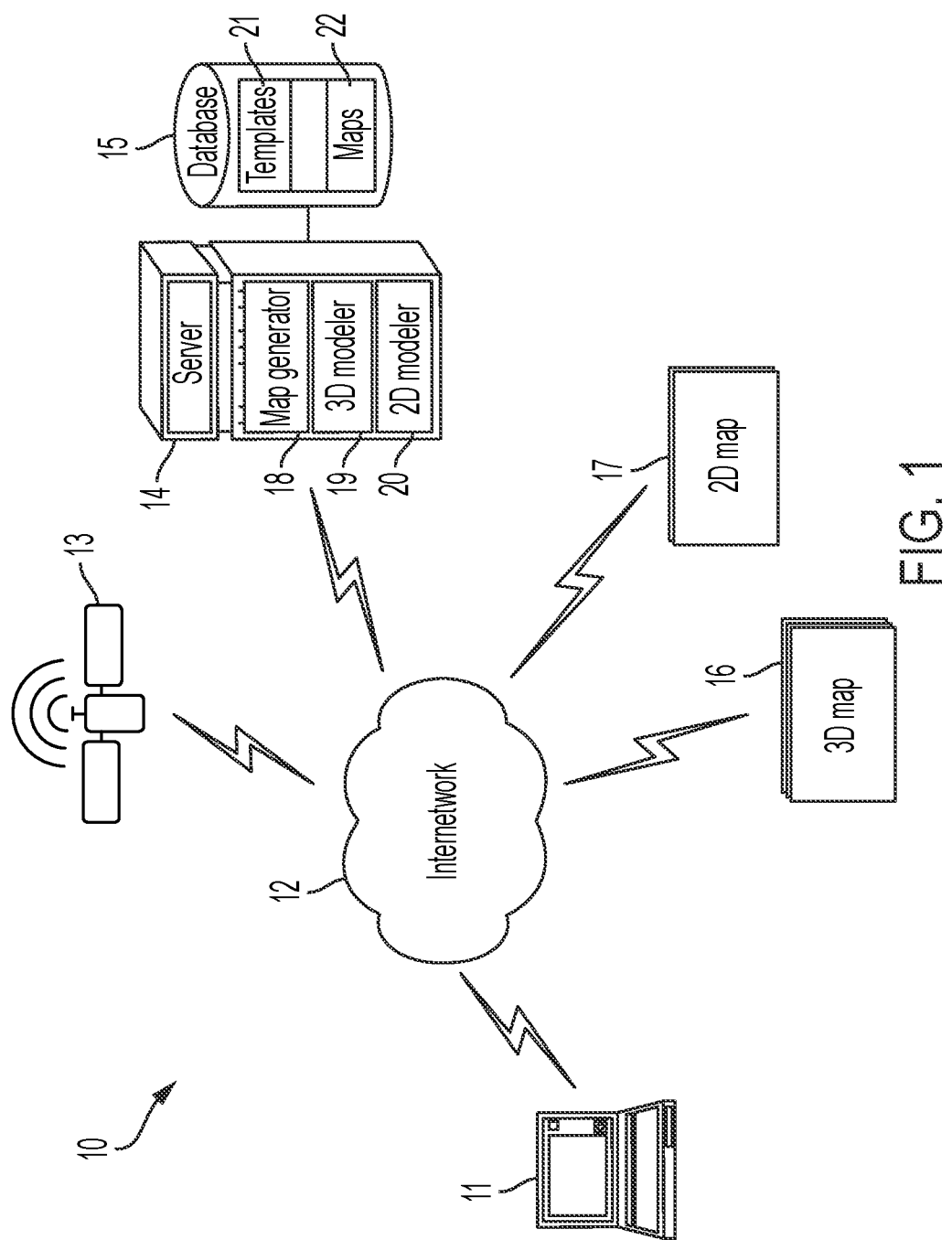
FIG. 1 is a block diagram showing a system for translating a 3D image into a 2D image, in accordance with one embodiment.

A modeler utilizes data associated with a visualization to transform that visualization to a different dimension. FIG. 1 is a block diagram showing a system 10 for translating a 3D image into a 2D image, in accordance with one embodiment. A request for a map is transmitted via an internetwork 12 to a server 14 with a map generator 18 from a computing device 11, such as a laptop computer, desktop computer, tablet, or other kind of computing device of a requestor. The request can include a size of the map to be generated and/or identification of a particular area to be mapped, such as a physical area or a virtual world. The data can include location data obtained via GPS 13 or compass, elevation data obtained via existing contour maps, aerial photography, or satellite imagery, and terrain type, as well as objects within or on the terrain, such as trees and building structures. In addition to or in lieu of the data obtained via satellites and existing maps, a user can manually enter the data, such as in the case of a virtual world. However, other types of data and sources of the data are possible.

Once obtained, a map is generated in either 2D or 3D via the map generator 18 and subsequently, stored in a database 15 interconnected to the server 14. In one embodiment, the server 14 and database 15 can be stored in the cloud. The stored maps can then be used to generate another map in a different dimension. For instance, a request for translating a map to a different dimension is transmitted by a computing device, which can be the same or a different computing device that requested generation of the map, to the server 14. The server 14 includes a 3D modeler 19 and a 2D modeler 20, which each translate a map from one dimension to a different dimension. The database 15 stores layer expansion templates 21 that instruct the 3D modeler 19 how to scale a 2D map to 3D and the 2D modeler 20 to determine a type of terrain and color of terrain for display based on a 3D map. The templates 21 can also include object templates that instruct the 3D and 2D modelers 19, 20 to add objects to the maps, once converted to the new dimension.

Pre-existing maps 16, 17 generated by other sources can be also used for translation, rather than accessing a map from the database 15. However, at a minimum, the pre-existing maps must include data sufficient to allow transition from one dimension to another, including altitude or elevation values, and terrain types.

Once generated, the new 2D or 3D map can be stored and provided to a sender of the request. The new dimension map can be used separate from or with the map from which the new dimension map was generated. An example of concurrent use includes a user navigating through a 3D visualization with a view of a 2D map of at least a portion of the 3D visualization to view a path of a drone heading towards the user to drop off supplies. Other scenarios of concurrent use of different dimension maps are possible.

Figure 2:
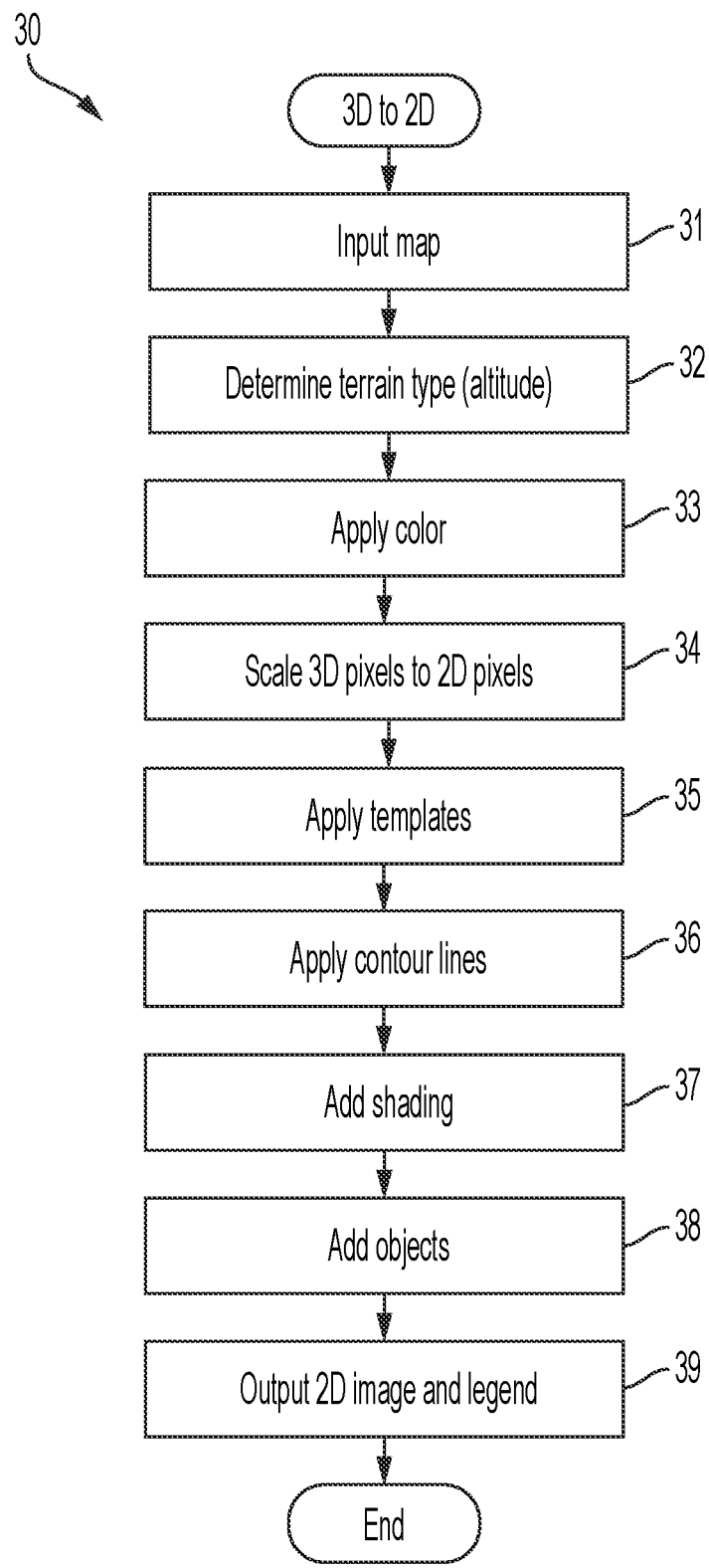
FIG. 2 is a flow diagram showing a method for translating a 3D image into a 2D image, in accordance with one embodiment.

Transitioning a 3D map into a 2D map can utilize data templates and metadata associated with the 3D map. FIG. 2 is a flow diagram showing a method 30 for translating a 3D image into a 2D image, in accordance with one embodiment. Data for a 3D visualization of an area in the real world or a virtual world is input into a map modeler (step 31). The 3D visualization can include maps and scans of 3D structures such as taken by mobile phone or camera. The 3D maps can each include multiple layers with each layer representing a feature or type of terrain. For example, a 3D map is layered with a base level representing a terrain type that is used to create a base image of the terrain. Other terrain layers are then layered on top of the base layer to add features, such as water, highways, mountains, and objects. Each layer of the 3D map can be input into the modeler separately or together.

Further, each layer in the 3D visualization is associated with voxels that each represent a three-dimensional cube associated with properties, such as height or altitude, layered feature and object information, and translation instructions. However, when viewing each layer separately, a voxel represents a 2-dimensional grid with a height of the voxel as a third dimension. In one embodiment, each layer has the same number of voxels and each voxel can be the same size. For example, each layer can be sized 512×512 voxels; however, other sizes of the layers are possible.

The height data associated with the voxels can include an implied position located in a known coordinate system, which is usually a grid or latitude/longitude, while the layered feature and object information can include type of terrain and features, such as trees or buildings on the terrain. The translation instructions can include a color base for the terrain type, texture overlaps for terrain or object renderings.

The voxels in each layer of the 3D map are processed to determine a type of terrain (step 32) and color for the terrain type (step 33) based on the metadata associated with the voxels. The voxels are each transformed (step 34) to a predetermined number of pixels, which can be set by a user, and the color determined for the terrain type is applied to the tile. Specifically, each voxel, along with metadata and a layer type associated with the voxel are expanded to one tile, which includes multiple n×n pixels and is set by a user based on a size of the 2D map to be generated. In one example, each voxel can represent a tile of 16×16 pixels. Other tile sizes are possible. Further, the voxels in each layer can be transformed and the color of the layers further away from the base layer override the colors below. Alternatively, only the voxels of the base layer are transformed to tiles and the features of the additional layers are provided on top of the base layer.

Each of the voxels in a common layer can have the same terrain type and the tiles are all colored the same for that terrain type. However, in a further embodiment, only a portion of the voxels in a common layer represent that terrain type and are colored. For example, a base layer of the 3D map represents grass. Each voxel in the grass layer is assigned a grass terrain and the tiles associated with the voxels are colored green to represent the grass terrain.

Subsequent terrain layers are placed over the base layer and can override the color of the base layer or another previous layer based on the terrain type. For instance, a second layer for water can be processed to identify voxels in that layer that represent at least a portion of a body of water. The color blue is identified for the water terrain and at least a portion of the tiles associated with the voxels are colored blue. The tiles to be colored blue are identified based on the metadata associated with the corresponding voxels and include a designation for the water terrain. For instance, the voxels identified as water terrain can include a designation for the water terrain, such as a 1 or a presence indicator, whereas the other voxels in the layer can be associated with a designation of 0 or null, indicating that the associated tile is not to be colored blue. The tiles associated with voxels representing a presence of water as determined by the metadata designation are colored blue and thus, override the color green of the grass terrain.

Once the voxels have been transformed, layer expansion templates can be applied (step 35) to the tiles to add detail provided in the 3D image. For example, the metadata associated with the voxels that correspond to the tiles include a designation of whether a particular template applies. For instance, with respect to the grass base terrain, grass texture can be applied to the green colored grass terrain, as further described below with respect to FIGS. 3A and 4, using a grassland template, while templates can be identified and applied to designate a type of body of water indicated by the blue tiles in the water layer, such as river or lake, as described below with respect to FIG. 3B.

Figure 7:
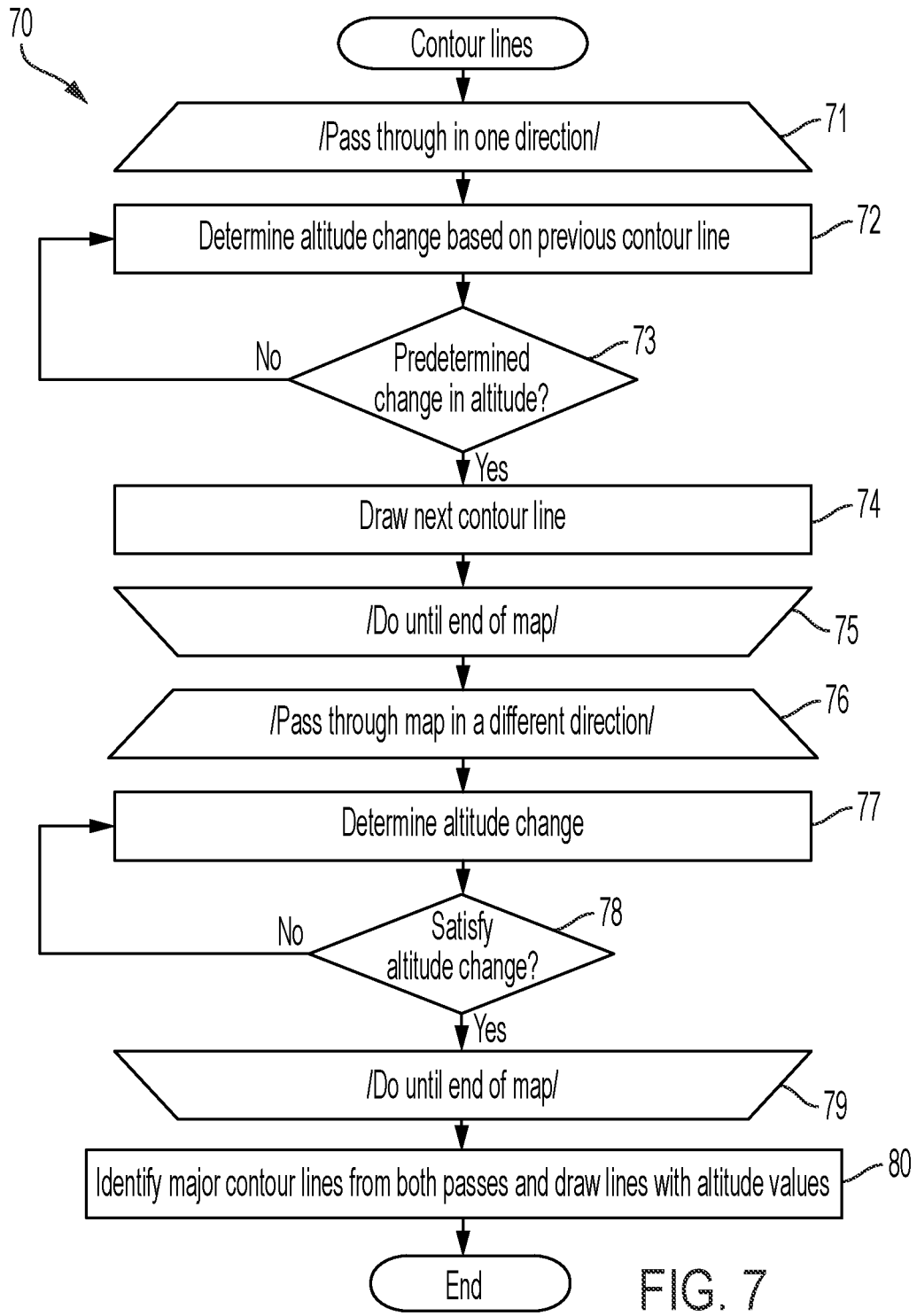
FIG. 7 is a flow diagram showing, by way of example, a method for placing contour lines on a 2D map.

Next, contour lines are added (step 36) to the 2D representation based on the altitude values associated with the 3D map, as described below in further detail with respect to FIG. 7. Shading is added (step 37) based on changes in altitude to provide a viewer with information about areas with higher altitude structures blocking or adjacent to lower altitude structures. Finally, objects, such as people, buildings, cars, and other types of objects can be added (step 38) to one or more of the tiles and a translated 2D map is output. In a further embodiment, the objects can be added prior to application of the shading.

Figure 3A:
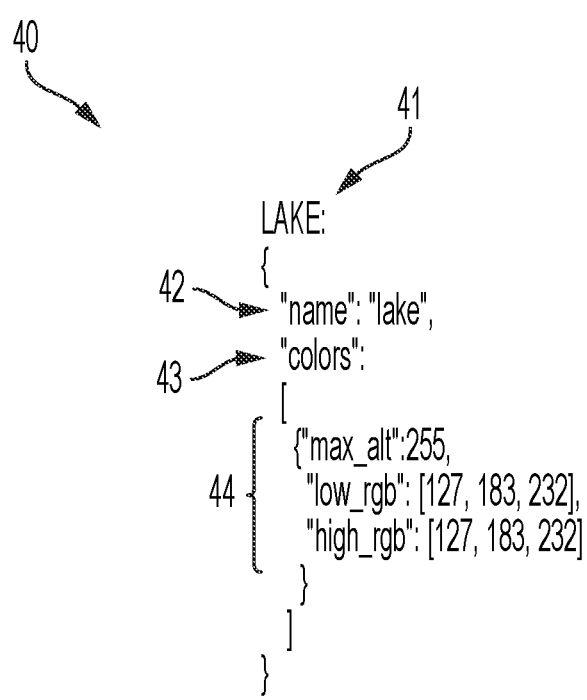
FIG. 3A is a block diagram showing, by way of example, a layer expansion template for a lake.

Detail added via the layer expansion templates can include color, texturing, and shadowing instructions for tiles associated with each terrain type and object type. Specifically, the layer expansion templates can instruct the modeler to translate features of the voxels of the 3D map to the 2D pixel tiles by identifying a color based on altitude, applying texture specific to a terrain type, and providing object overlays. FIG. 3A is a block diagram showing, by way of example, a layer expansion template 40 for a lake. The template can be written in JSON format or a different format. Each template to be applied to a tile is based on the type of the terrain of that tile, which can be determined via the metadata associated with the voxel for that tile. For example, tiles that are associated with a water terrain are compared with the templates and one template related to a body of water, such as a lake, ocean, river, or pond is identified for providing further detail to represent the water terrain tiles in the 2D image. The templates are identified for a tile based on metadata associated with the voxel represented by that tile. For instance, the metadata could include null for a river template, but present for a lake template, which indicates that features designated in the lake template are applied to the tile.

For each template, a title 41 of the template 40 is provided and in this example, is titled Lake. Categories of information in the template include name 42 of terrain type represented by the template and colors 43, which are representative of features of the terrain type. Other types of categories are possible. The name 42 category lists the name of the terrain type to be represented, while the colors 43 category provides one or more colors to use for the associated terrain type. Specifically, the colors category provides one or more colors 44 for representing the water terrain type based on altitude. For example, the lake is represented by a single color at or below an altitude of 255 ft. The color can be defined by red, green, blue values for a low rgb and high rgb. Each RGB value represents a color, for example, [0, 0, 0] represents the color black, while [255, 255, 255] represents white. Here, the color identified in the lake template represents a color of a lake located within the tile and overrides the default blue color of the water layer. A river, which is not as deep as a lake, may be associated with a lighter blue or ripples, which indicate the water moving downstream.

Other terrain type templates are possible. For example, FIG. 3B is a block diagram showing, by way of example, a layer expansion template 50 for grasslands. A title 51 of the template 50 is provided and in this example, is titled Grasslands. The template 50 includes categories of features that are used to display a terrain type represented by the template. The categories can include name 52 of the terrain type and colors 53 to be displayed for the terrain type. In this example, the grasslands located below an altitude of 220 ft are represented by one color, such as green, and gradually turn to a different color, such as white above 220 ft. to represent snow. The color is specified by the rbg values provided in the template.

Each layer expansion template can also include information for an overlay, such as to provide texture to the color representing terrain type. For example, the grassland template can include an overlay 55 to simulate a grass effect. The information for the overlay can include categories 56 for paint mode, position, and region. The paint mode category instructs the modeler to overlay regions having a simulated grass effect into the tile for the grassland terrain, while the region_inx category provides a counter used when generating the templates to index through the regions when multiple regions are present. The position category indicates one or more locations in the tile to place the simulated grass regions. In this example, the position indicates that the simulated grass regions should be overlayed randomly when placed. Further, a count category can indicate how many simulated grass shapes are to be placed in random groupings within each tile. Here, the count provides that seven shapes representing the grass should be placed within each tile. Finally, a regions category describes the overlay of the specific simulated grass region to be placed into the tile. Numbers in the region category represent the colors to use when imaging that region. For example, looking at the grasslands region, there are two main regions, the first being one row high and the second is two rows high. The non-zero numbers indicate the mask or overlay placed into the tile, based on the position and paint mode.

Figure 4:
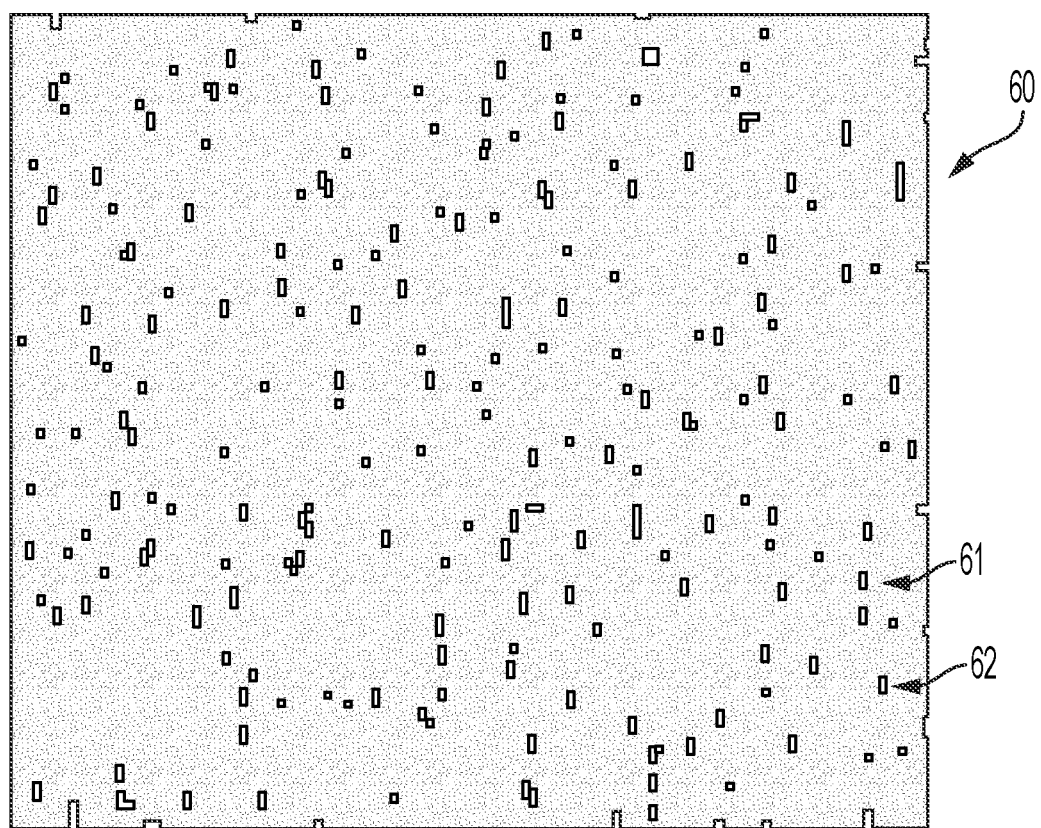
FIG. 4 is an image of the grassland terrain and overlay provided by the layer expansion template of FIG. 3B.

A visual of the grasslands terrain type and overlay instructed by the template can be displayed. FIG. 4 is an image of the grassland terrain and overlay provided by the layer expansion template of FIG. 3B. A terrain type for grasslands is displayed on an area of the 2D map, such as on a collection of tiles 60. The grassland terrain type is characterized by different colors based on altitude as described above with respect to FIG. 3B. For example, the color green 61 can be used to represent the grassland terrain at locations with an altitude 220 ft or less, while white 62 can be used to represent snow on the grassland at locations with an altitude between 220 and 255 ft. The grass textured overlay is placed to represent grass and can be viewed as different colored shapes over the green color.

Figure 5:
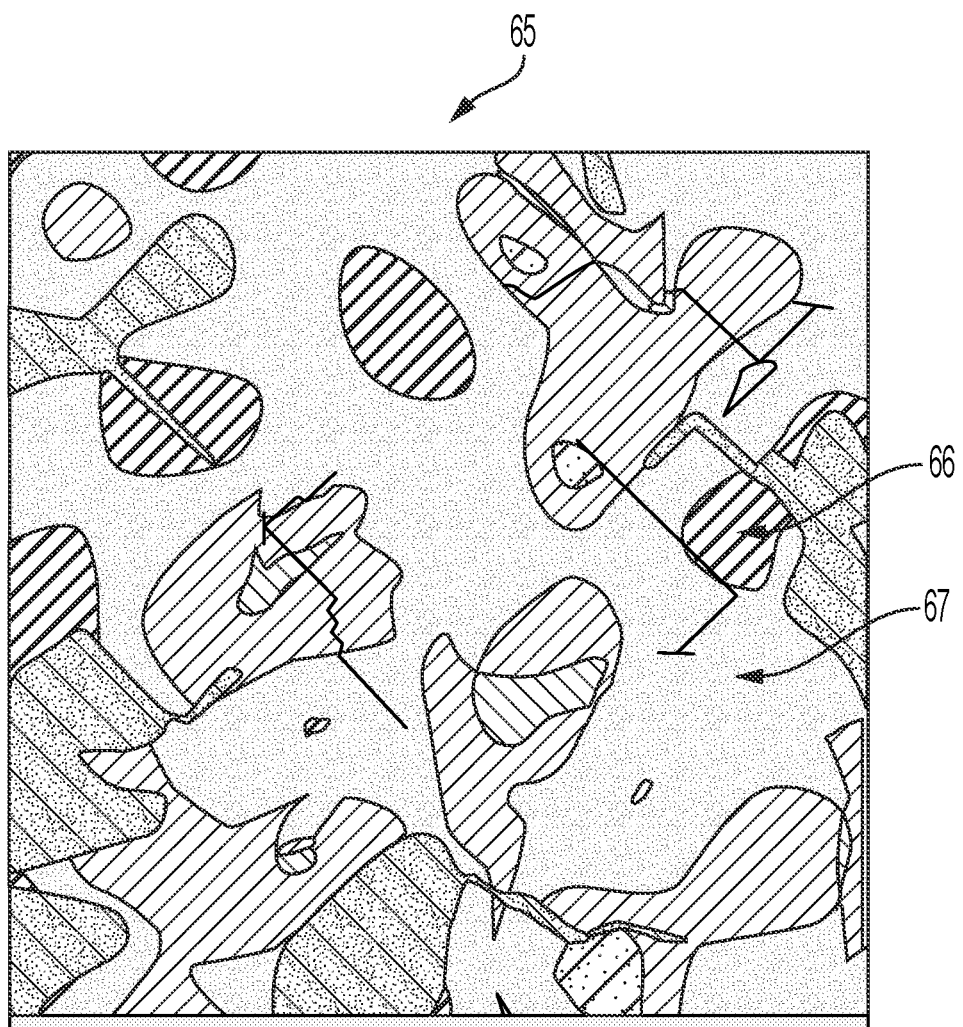
FIG. 5 is a block diagram showing, by way of example, a 2D map without contour lines.
Figure 6:
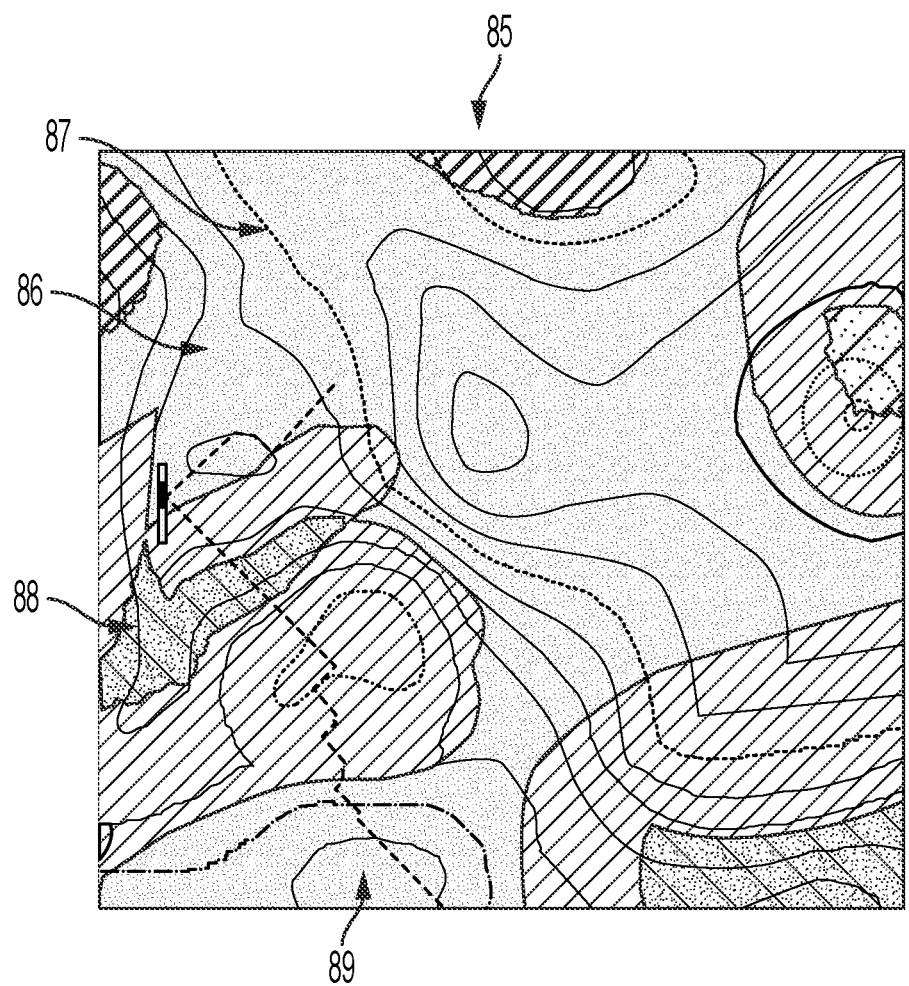
FIG. 6 is a block diagram showing, by way of example, a 2D map with contour lines.

Returning to the discussion with respect to FIG. 2, once the voxels have been scaled to tiles, and the colors and overlays for the associated terrain types have been generated, contour lines can be added (step 35) to the 2D representation. The contour lines indicate altitude changes and help a user by providing additional information to a traditional topographic map. For example, FIG. 5 is a block diagram showing, by way of example, a 2D map without contour lines, while FIG. 6 is a block diagram showing, by way of example, a 2D map with contour lines. In FIG. 5, the map 65 displays different shapes of color 66, 67, which represent terrain type and altitude, as described above with reference to FIGS. 3A-B and 4, but no contour lines. In FIG. 6, the map 85 displays different shapes of color 88, 89, which represent the terrain type and altitude similar to FIG. 5, but also include the addition of contour lines 86, 87, which provides additional information about the area represented by the map to a viewer. Specifically, contour lines help the viewer to compare the altitude of different areas within the map to identify hills, mountains, and other high altitude structures.

The contour lines can be added by making multiple passes through the representation of the 2D map. FIG. 7 is a flow diagram showing, by way of example, a method 70 for placing contour lines on a 2D map. A first pass travels (step 71) across the 2D map in one direction to determine an altitude change. A first pass can include across columns or rows of the tiles. Altitude data is associated with the tiles of the 2D map and as the altitude data is read, a determination is made as to whether a change in altitude exists (step 72) as the map is scanned. The change can be measured from a starting altitude on one side of the map or a previous contour line, and compared with a predetermined change. If the change satisfies (step 73) the predetermined change in altitude, a next contour line is drawn (step 74). The changes are measured, and contour lines are drawn until the end of the map is reached (step 75).

Subsequently, another pass of the map is made (step 76) in a different direction than the first pass. The second pass is performed the same as the first pass by looking for a change in altitude. The change can be measured from a starting altitude at the beginning of a pass or a previous contour line. If the change in altitude satisfies (step 77) a predetermined change in altitude, a next contour line is drawn (step 78). As the second pass moves across the 2D map, changes in elevation are identified and contour lines are drawn, until the end of the map is reached (step 79). In a further embodiment, if the 3D image is a scan, 3D measurements can be used instead of altitude to determine contour lines.

Each contour line that represents a predetermined major contour line, such as each 1000 ft value or each 10,000 ft value, such as 10,000 ft, 20,000 ft, 30,000 ft, and so on, are highlighted or marked (step 80) in bold and the altitude value is placed along or adjacent to the contour line. In one example, the major contour lines are not immediately drawn when passing through the map, but can be added later to allow insertion of the altitude values into the major contour lines. The altitude values can be rotated to match an angle of the contour line representing that value.

Figure 8:
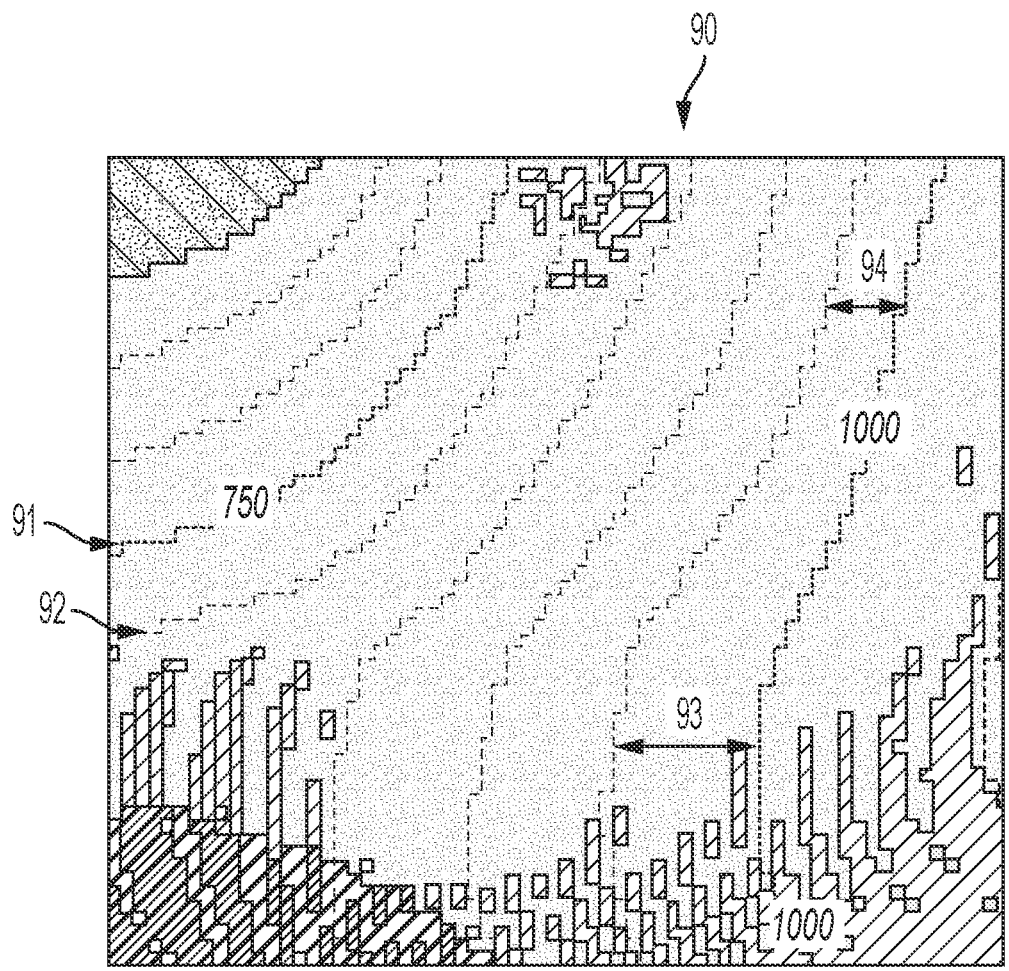
FIG. 8 is a block diagram showing, by way of example, a portion of a map with contour lines.

The contour lines help a viewer to distinguish between low and high altitude features, such as hills versus mountains. FIG. 8 is a block diagram showing, by way of example, a portion of a map 90 with contour lines. The contour lines 91, 92 are determined and placed as described above with reference to FIG. 7. Specifically, the contour lines are drawn along the x and y axes based on the two passes through the map. The darker contour lines 91 represent major contour lines, which provide a predetermined altitude. In this example, the major contour lines are located every 250 ft. Other altitude differences are possible for representing the major contour lines. In the map 90, the closer 94 the contour lines are positioned, the steeper the change in altitude. Conversely, the farther apart 93 the contour lines, the less steep the change in altitude.

Figure 9:
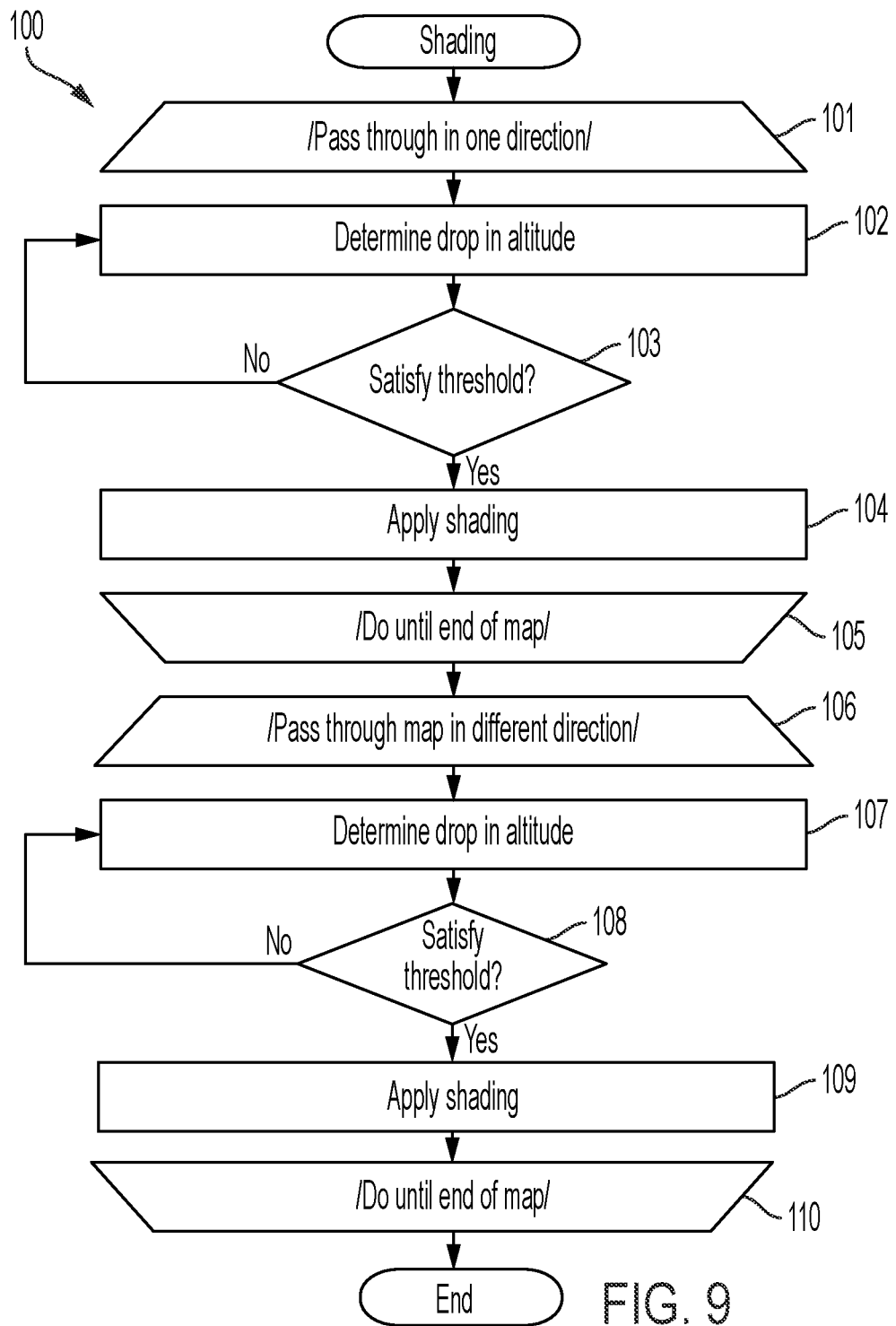
FIG. 9 is a flow diagram showing, by way of example, a method for adding shading to a 2D map.

Returning to the discussion with respect to FIG. 2, shading is added (step 36) to the 2D map after the contour lines are applied. Similar to the process of adding contour lines, two passes are made through the 2D map to determine whether shading should be added. FIG. 9 is a flow diagram showing, by way of example, a method 100 for adding shading to a 2D map. Current 2D maps may include shading; however, the current practice for adding shading is by use of data from a Shuttle Radar Topography Mission in 2000 and which was released for use in 2015. This conventional shading method is not generated from the sun or terrain, but from a snapshot of the Earth taken in 2000. If the shading is calculated, such calculation is typically performed using complex, computationally expensive ray-casting on GPU hardware.

The following method for shading provides a quick and computationally inexpensive method for creating appropriate and adjustable to the sun position surface terrain shading. Similar to adding contour lines, shading is added to the 2D map by making two passes through the map. During a first pass (step 101) of the map in one direction, such as down the columns of tiles or across the rows of tiles, drop in altitude are determined (step 102). For example, an altitude is identified and as the map is being scanned in one direction, if the attitude is decreasing, a drop in altitude is determined. Subsequently, the drop in altitude is compared to a predetermined altitude drop and if the identified altitude drop satisfies or exceeds (step 104) the predetermined altitude drop, shading is applied (step 105). In one embodiment, the entire tile in which the altitude drop was identified is shaded. The predetermined drop in altitude represents a higher altitude object that would shade an object at the lower altitude. The direction of the shadowing is based on how the pass through of the map occurs so that the shadows can be projected from different light source locations. Specifically, shading can be applied differently based on a corner from and direction in which the map is scanned.

However, if the identified altitude drop does not satisfy the predetermined altitude drop (step 103), the altitude drop is monitored (102) and compared to the predetermined drop as the pass of the map continues. When the determined drop in altitude does not satisfy the predetermined drop, an object at the higher altitude is not high enough to shade an object at the lower altitude of the altitude drop. The first pass of the map ends (step 105) when the end of the map is reached. A second pass of the map is made (step 106) in a different direction.

During the second pass, a drop in altitude is determined (step 107) and is compared (step 108) to a predetermined altitude drop. If the determined drop satisfies or exceeds the predetermined altitude drop, shading is applied (step 109). Identification of drops in altitude, comparison, and shading continues as the second pass sweeps across the map until the end of the map is reached (step 110).

Figure 10:
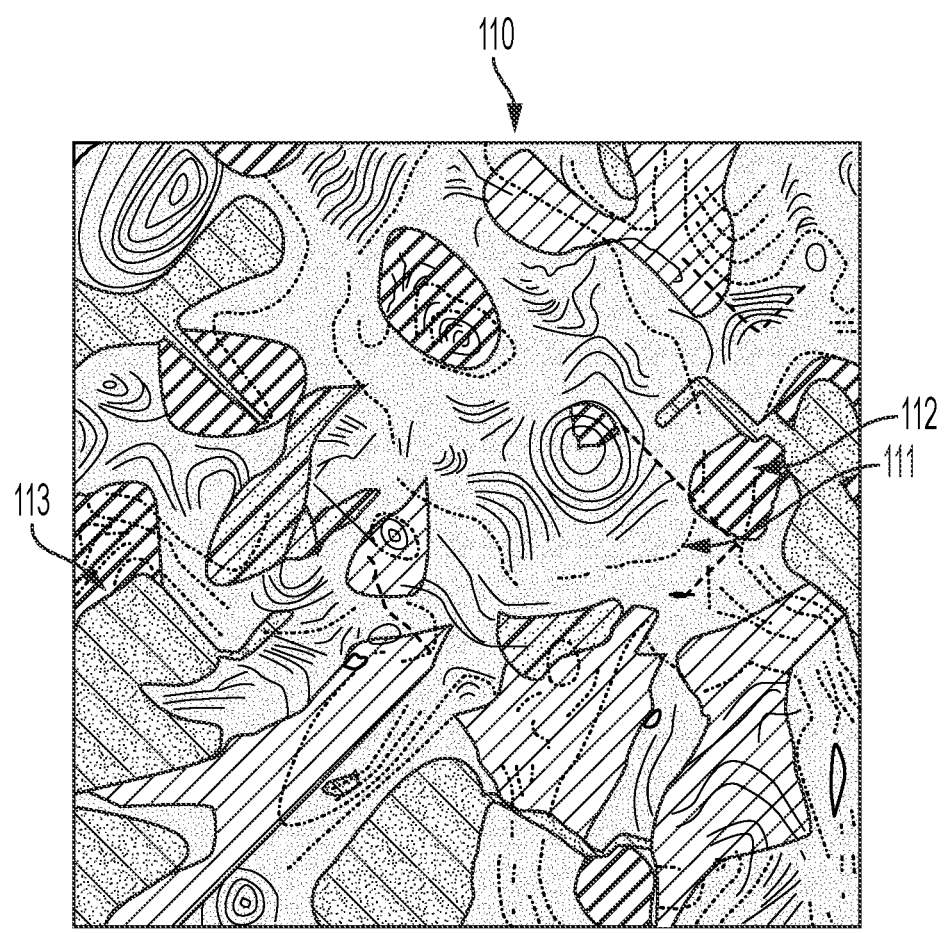
FIG. 10 is a block diagram showing, by way of example, a 2D map with contour lines and shading.

The applied shading provides information helpful to a viewer to determine elevation, as well as shape and terrain of the topographic 2D map. FIG. 10 is a block diagram showing, by way of example, a 2D map with contour lines and shading. A 2D map 110 is generated from a 3D map and includes color and terrain type 112, contour lines 111, and shading 113. Shading is applied after the color and terrain type is applied and can darken the color applied to the tiles so that the terrain colors get darker. In a further embodiment, a darker color, such as gray or black can be applied to the tiles as shading.

Together, the color, terrain type, contour lines, and shading provide a viewer with information to not typically provided by a 2D map that can be used to help the user better understand the area represented by the map.

Returning to the discussion with respect to FIG. 2, after the shading has been added to the 2D topographical map, objects can be added (step 37) using object templates. The objects can include buildings, towers, hikers, planes, trees, or roads, as well as other types of objects that can appear on a map. The buildings, towers, hikers, and roads can be placed onto a specific position of the image, while trees or crowds of people can be randomly placed inside a tile so a forest or crowd, for example, does not become a repeating pattern. The types of objects and position of the objects can be determined via object templates, which are similar to the layer expansion templates for terrain type and color. FIG. 11A is a block diagram showing, by way of example, an object template 120 for an airport tower for placement within a tile. The tile is identified via metadata associated with a voxel represented by the tile. For example, the metadata can include a designation of null for objects not included in that tile and a designation of present for objects that are to be included in the tile. However, other types of designations are possible.

The template includes a title 120 and a name of the object 121 to be placed. In this example, the object is an air tower and the object will be overlayed on the 2D map as defined by a paint mode category 122. A position category 123 provides a location on a tile in the 2D map at which the air tower will be placed. The regions category 125 provides instructions for drawing the air tower and represent the colors of the air tower to be placed in the tiles.

Figure 11B:
FIG. 11B is a block diagram showing, by way of example, an object template for a pine tree.

Some objects need to be added to a tile multiple times, such as trees to represent a forest or people in a crowd. FIG. 11B is a block diagram showing, by way of example, an object template for a pine tree. The template 130 includes a title of the template, as well as a name of the object 131 to be placed. In this example, the object is a pine tree. A paint mode category 132 provides that the object is to be overlayed on the 2D topological map, while a position category 133 indicates that the pine tree object will be placed within a tile randomly. A count category 135 indicates how many pine tree objects are to be placed within one or more of the tiles. A regions category 136 can include instruction for drawings the pine trees.

Some of the object templates may include additional categories of information, such as hidden objects. If an object is determined to be hidden, the object is not placed in a main output image, but is placed in a special output image. The special output image can include only the hidden objects, while another image would include the normal objects.

Finally, returning to the discussion with respect to FIG. 2, after the contour lines, shading, and objects have been added to a 2D topological map, the image is output (step 38) for use by itself or with the 3D map from which the 2D map was generated. By itself, the 2D map can be easier to use than a 3D map when navigating through an area displayed by the map. However, use of the maps concurrently can be helpful, for example, when a user is playing a video game in a 3D world, but wants an overview of the world to look for enemies. Locations of the enemies can be provided on the 2D topological map.

Figure 12:
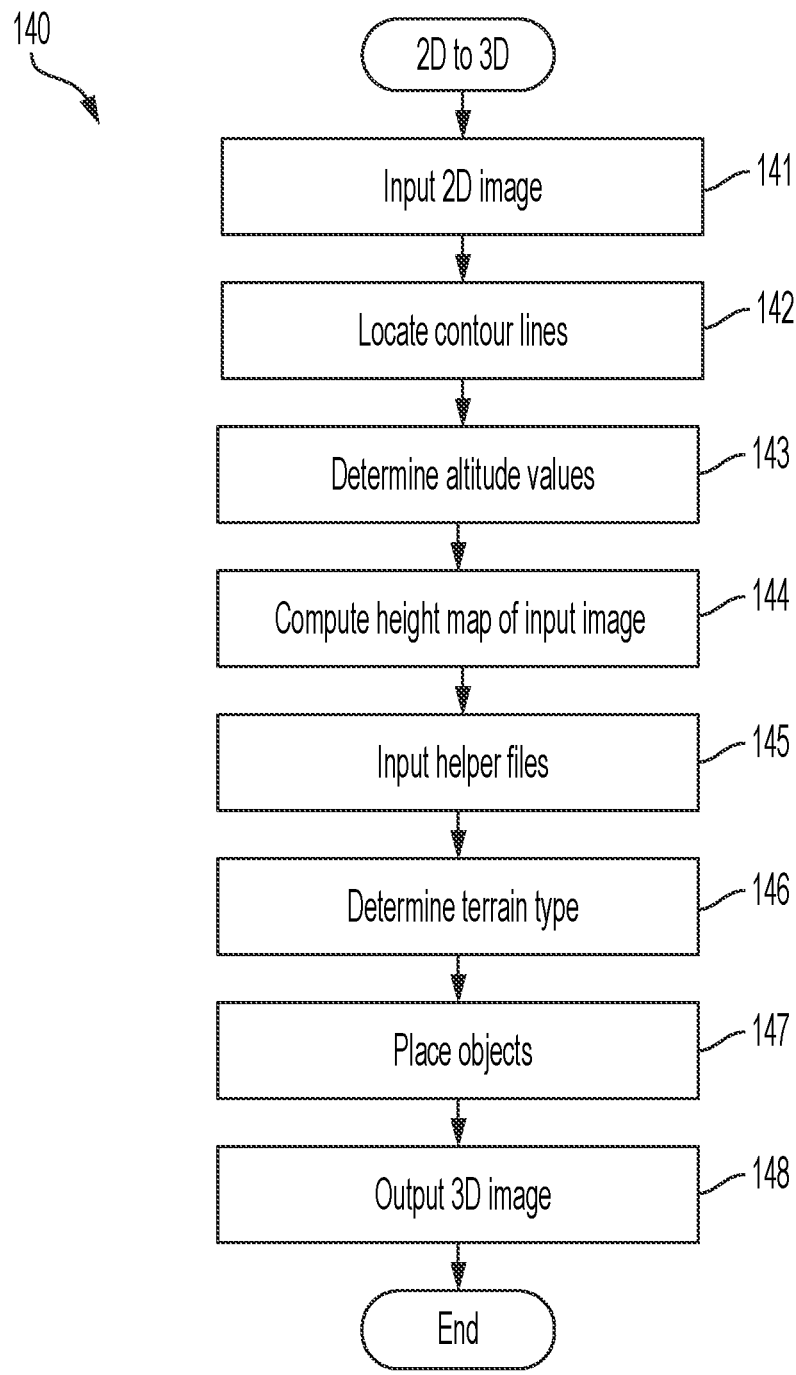
FIG. 12 is a flow diagram showing, by way of example, a method for transitioning a 2D visualization into a 3D visualization.

Other times, a user with a 2D map may want a 3D visualization of the same area to use in lieu of or in addition to the 2D map. FIG. 12 is a flow diagram showing, by way of example, a method 140 for transitioning a 2D visualization into a 3D visualization. A 2D map, such as the one generated according to FIG. 2 described above, is input (step 141) into a 3D modeler. The 2D map includes pixels that are grouped into tiles. Other types of 2D maps can be used. At a minimum, the input required for the 2D map can include hand drawn contour lines with altitude markings. Contour lines are located (step 142) within the 3D map and the altitude values are determined (step 143) based on the contour lines. In one example, the altitude values are determined from the major contour lines by reading the values using optical character recognition (OCR).

For example, once regions of the 3D visualization with information regarding elevation have been identified, the regions are cropped from the visualization and OCR is performed on the cropped images. One example of an approach for performing OCR includes character-by-character segmentation and recognition. Character-by-character segmentation includes steps, such as threshold the cropped region of interest into a binary foreground (text) and background (image) image. Then, align and segment each letter using methods including vertical or horizontal pixel projections blob detection, and connected component analysis, among other methods. Finally, each segmented number can be recognized via a trained classifier.

Another approach for reading the altitude values on the major contour lines includes sweeping a trained classifier over the cropped regions via a window and calculating a probability at each step in a stride, which is a distance between two major contour lines, that a window includes a number. Specifically, a number of minor contour lines, which are without designated altitude values, are counted between the major contour lines and the distance between the major contour lines is divided by the number of minor contour lines to determine the altitude values of the minor contour lines. A matrix of character confidences for each symbol in an OCR dictionary, at each window location results from the classifier. The resulting matrix is then analyzed to determine a position and class of each number.

Once the contour lines are identified and altitude values are determined, a height map of the input 2D visualization is generated (block 144). Specifically, height values of the tiles between the contour lines are interpolated to make a base layer for the 3D map. During the interpolation, the altitude values are assigned to the voxels in the base layer of the height map by using a distance from surrounding contour lines.

Once the base layer of the 3D map is generated, helper files, such as layer expansion templates, object templates, and a topographical map legend can be input (step 145). Using the layer expansion templates, terrain type and color can be determined (step 146). The tiles of the 2D image are sized to match suggestions of the helper files. Each tile is matched against the helper files to determine the terrain type at each output resolution location. For instance, each 2D tile represents a voxel and the helper files represent color/texture matching information to compare with each 2D tile to determine a best match for the terrain type to assign to that tile. The determined best match helper files are then used to generate a voxel corresponding to the 2D tile.

Also, using the object templates, objects can be placed (step 147) in the map by identifying the best helper file and using that helper file to place objects or other layered features in the voxel corresponding with the 2D time best matching the helper file. Finally, once the terrain type, color, and objects have been added, the 3D visualization is output (step 148). Specifically, once the output layers of the 3D visualization are assigned during the matching process with the helper files to produce the terrain, river, object, altitude, and other layers, there is a down-sizing from tiles to voxels. The terrain information and other layer information is sized such that n voxels are output per tile. In one embodiment, n=1. However, other values of n are possible.

While the invention has been particularly shown and described as referenced to the embodiments thereof, those skilled in the art will understand that the foregoing and other changes in form and detail may be made therein without departing from the spirit and scope of the invention.

What is claimed is:

1. A system for translating a 2D image to a 3D image, comprising:
    a database configured to store a 2D image comprising pixels grouped into tiles; and
    a server comprising a central processing unit, memory, an input port to receive the 2D image from the database, and an output port, wherein the central processing unit is configured to:
        locate on the 2D image contour lines each associated with an altitude value;
        determine the altitude values based on the contour lines;
        represent the tiles with voxels, comprising:
            compare each tile to a set of layer expansion templates, wherein each layer expansion template represents a terrain texture and a terrain color;
            identify one of the layer expansion templates that best matches each tile; and
            generate each voxel corresponding to one of the tiles based on the identified layer expansion template that best matches that tile;
        generate a height map of the voxels based on the contour lines and altitude values as a base layer for a 3D image;
        place objects in the 3D image; and
        output the 3D image.

2. The method according to claim 1, wherein the central processing unit reads the altitude values using optical character recognition to determine the altitude values.

3. The method according to claim 1, wherein the central processing unit sweeps a trained classifier over cropped regions of the 2D image to determine the altitude values.

4. The method according to claim 1, wherein the central processing unit accesses object templates and selects the objects for placement in the 3D image via the object templates.

5. The method according to claim 1, wherein the central processing unit accesses a map legend for use with the 3D image.

6. The method according to claim 1, wherein the central processing unit accesses the layer expansion templates and identifies the terrain type provided via the accessed layer expansion templates.

7. The method according to claim 6, wherein the central processing unit colors the voxels based on the terrain type using the layer expansion templates.

8. The method according to claim 6, wherein the layer expansion templates provide instructions for the tiles of the 2D image to scale to the output voxel size of the 3D image.

9. The method according to claim 6, wherein the layer expansion templates comprise color, texturing, and shadowing instructions for the tiles, which are each associated with the terrain type and object type.

10. The method according to claim 6, wherein the central processing unit translates the 3D image back into the 2D image.

11. A method for translating a 2D image to a 3D image, comprising:
    obtaining a 2D image comprising pixels grouped into tiles;
    locating on the 2D image contour lines each associated with an altitude value;
    determining the altitude values based on the contour lines;
    representing the tiles with voxels, comprising:
        comparing each tile to a set of layer expansion templates, wherein each layer expansion template represents a terrain texture and a terrain color;
        identifying one of the layer expansion templates that best matches each tile; and
        generating each voxel corresponding to one of the tiles based on the identified layer expansion template that best matches that tile;
    generating a height map of the voxels based on the contour lines and altitude values as a base layer for a 3D image;
    placing objects in the 3D image; and
    outputting the 3D image.

12. The method according to claim 11, further comprising:
    reading the altitude values from contour lines using optical character recognition to determine the altitude values.

13. The method according to claim 11, further comprising:
    sweeping a trained classifier over cropped regions of the 2D image to determine the altitude values.

14. The method according to claim 13, further comprising:
    accessing object templates; and
    selecting the objects for placement in the 3D image via the object templates.

15. The method according to claim 11, further comprising:
    accessing a map legend for use with the 3D image.

16. The method according to claim 11, further comprising:
    Accessing the layer expansion templates; and
    applying the terrain type provided via the accessed layer expansion templates.

17. The method according to claim 16, further comprising:
    coloring the voxels based on the terrain type using the layer expansion templates.

18. The method according to claim 16, wherein the layer expansion templates provide instructions for the tiles of the 2D image to scale to the output voxel size of the 3D image.

19. The method according to claim 16, wherein the layer expansion templates comprise color, texturing, and shadowing instructions for the tiles, which are each associated with the terrain type and object type.

20. The method according to claim 11, further comprising:
    translating the 3D image back into the 2D image.

* * * * *